Nov. 7, 1944.   M. M. BRODERSEN   2,361,914
CONTROL FOR HAULING SCRAPERS
Filed March 21, 1941   4 Sheets-Sheet 1

INVENTOR:
Max M. Brodersen

Nov. 7, 1944.  M. M. BRODERSEN  2,361,914
CONTROL FOR HAULING SCRAPERS
Filed March 21, 1941  4 Sheets-Sheet 3

INVENTOR:
Max M. Brodersen

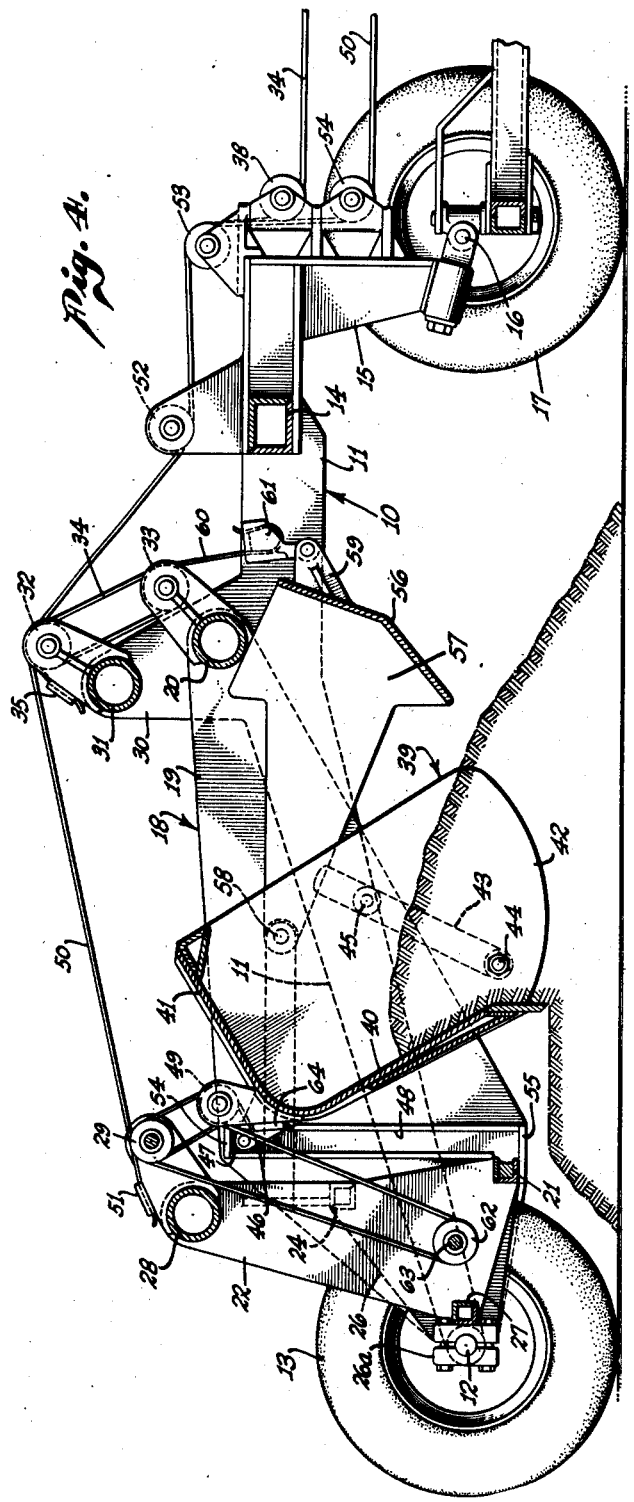
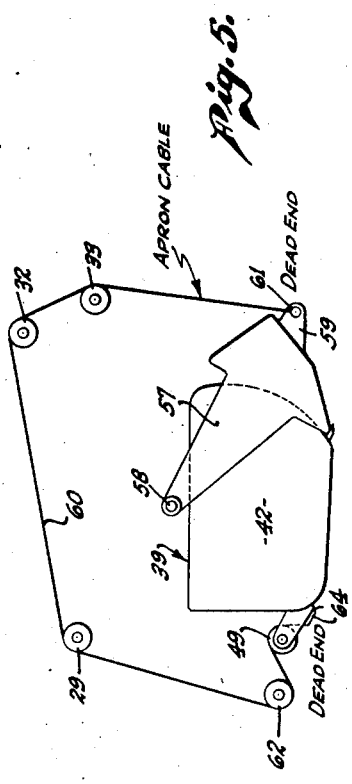

Patented Nov. 7, 1944

2,361,914

UNITED STATES PATENT OFFICE 2,361,914

CONTROL FOR HAULING SCRAPERS

Max M. Brodersen, Alhambra, Calif., assignor to The Slusser-McLean Scraper Company, Sidney, Ohio, a corporation of Ohio Application March 21, 1941, Serial No. 384,584

11 Claims. (Cl. 37—126)

This invention relates generally to hauling scrapers having a bowl and a closure or apron for the receiving end of the bowl, and is an improvement in the means for controlling the opening and closing of the apron.

Heretofore, in scrapers of this type, the tilting of the bowl and the opening and closing of the apron has been effected in a predetermined order by a single cable. This cable was associated with the bowl, the apron and a hoist on the tractor, so that upon winding the cable on the hoist, the apron, by virtue of being lighter in weight than the bowl, would open first. Then, upon further pulling of the cable, the bowl would be tilted for discharging, and conversely, by releasing the cable, the bowl would be first returned to its horizontal position, then, upon further releasing of the cable, the apron would be closed.

By reason of this sequential positioning of the bowl and the apron, the implement could not be operated at a high degree of efficiency, because the operator's attention had to be divided between forward observation of the terrain over which the tractor was driven and the rearward observation of the implement to control the degree of operation.

For example: As the tractor is moved to the digging location and the cable is released to lower the bowl into the scraping position, the operator had to turn rearwardly to see that just enough of the cable was released to position the bowl without the apron closing, so that the apron did not interfere with the scraping operation. Then, after the scraping operation was completed, and the bowl is being raised to the carrying position, the operator also had to see that the apron was lowered to close the receiving end of the bowl at the proper time to prevent spilling part of the load. Furthermore, time was wasted by the operator in waiting until the apron was raised to its fully opened position before the bowl could be tilted for dumping the load and in closing the apron after the bowl has reached its normal position.

Another objection to the single cable control was that the weight of the apron counter-balanced a proportionate amount of the bowl weight. Thus, the returning of the bowl to its normal position presented difficulties when the bowl pivots became clogged with dirt sufficiently to offer resistance to the differential weight of the bowl.

Therefore, one of the principal objects of my present invention is to provide a scraper in which the bowl and the apron are inter-connected by means independent of the bowl tilting means, so that the tilting of the bowl for discharging will simultaneously cause the apron to raise to the open position, and conversely, when the bowl is restored to the horizontal or carrying position, the apron is simultaneously lowered to close the receiving end of the bowl.

Another important object is to arrange the interconnecting means between the bowl and the apron, so that when the bowl is lowered from the carrying to the digging position, the apron automatically opens the receiving end of the bowl to admit the scraped up earth. The opening of the receiving end of the bowl being automatically regulated in proportion to the depth of the digging operation, to insure efficient and compact entry of earth into the bowl in any volume within the working range of the implement.

Thus, by means of this invention, greater efficiency in operation of the scraper is effected, because the opening, closing and regulating of the apron, in proportion to the digging operation, is entirely automatic, and, consequently, requires no attention on the part of the operator, who can now direct all of his attention to simply loading and discharging the bowl. Furthermore, the weight of the apron assists in returning the bowl from the tilted to its normal position.

With these and other objects in view, the invention consists in the combination, correlation and construction of parts, members and features which will be described in the specification, and will be finally pointed out in the claims.

Referring to the drawings:

Figure 4 is a section similar to Figure 2, but showing the scraper in the load-dumping position.

Figure 5 is a diagram showing the cable arrangement for controlling the bowl closure.

Figure 1:
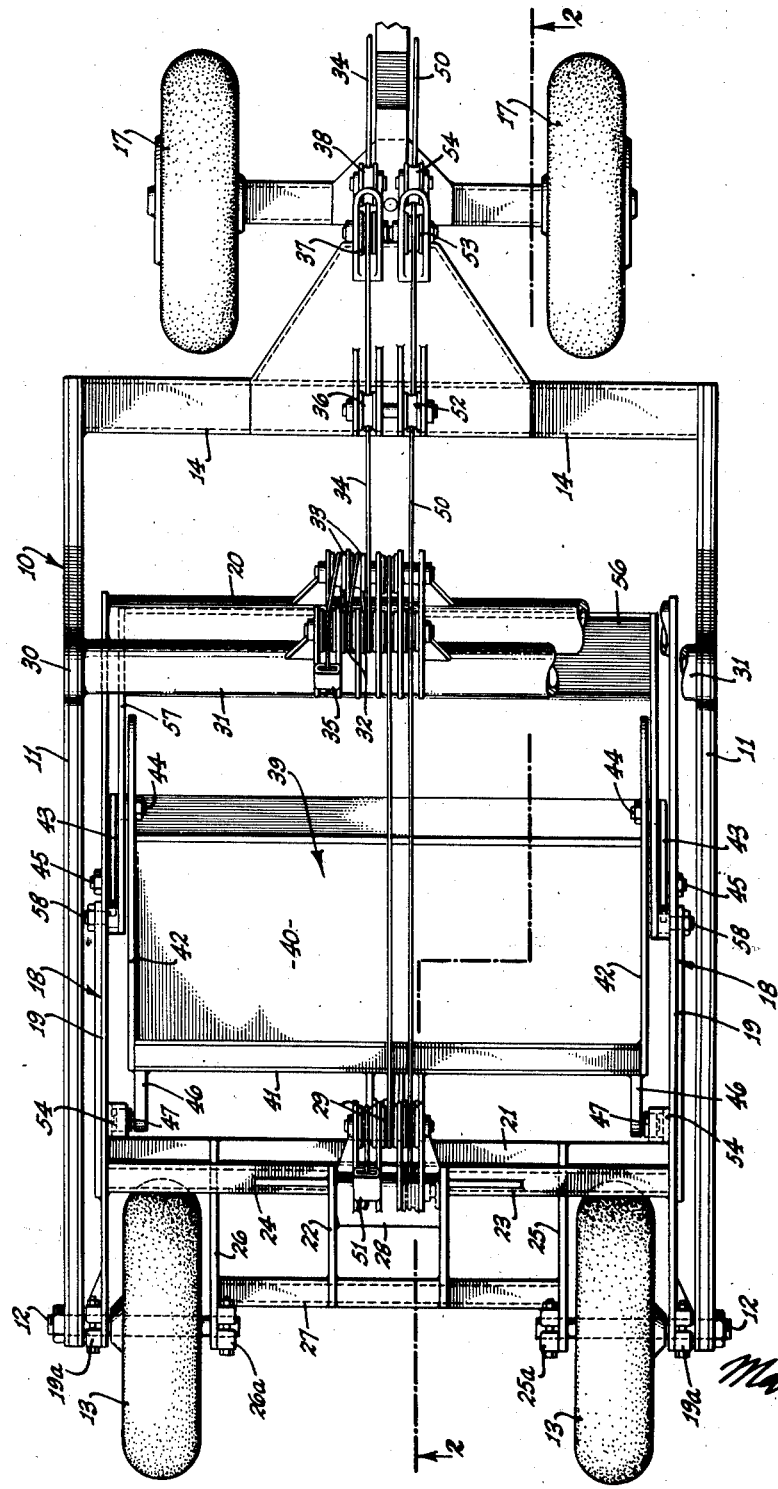
Figure 1 is a plan view of the scraper embodying my invention.
Figure 2:
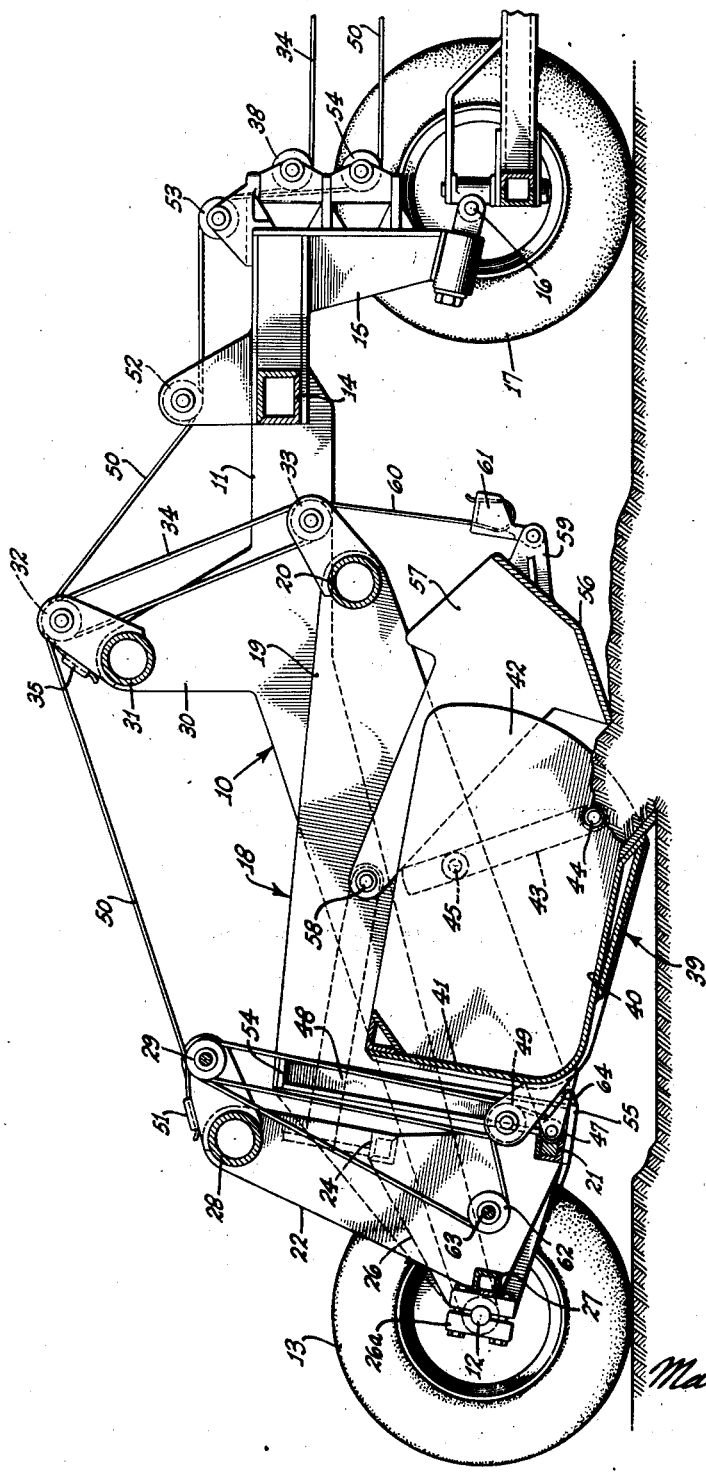
Figure 2 is a sectional elevation taken on line 2—2 in Figure 1, showing the scraper in the digging position.

In the drawings the invention is illustrated in one of its forms of embodiment as incorporated in an implement having a frame structure similar to that shown in my co-pending application, Serial No. 378,397, filed February 11, 1941. The frame structure includes a rectangular primary frame 10 comprising a pair of spaced apart side elements 11 which are supported at the rear ends on the outer ends of axles 12, of wheels 13, and are rigidly connected at the forward ends to a cross member 14. The cross member 14 has centrally interposed between the ends thereof, a forwardly extending and downwardly depending leg 15 which is swivelably supported, as at 16, on a wheeled carriage 17 which in turn is adapted for connection to a tractor in the usual manner.

A secondary frame 18, interposed between the side members 11 of the primary frame, comprises a pair of spaced apart side plate members 19 having a generally trapezoidal contour. The side plates 19 are rigidly connected at the forward ends to a tubular cross member 20 and are supported at the rear ends on the axles 12, as at 19a, adjacent the outer sides of wheels 13.

The rear ends of the side plates 19 are rigidly inter-connected by a fabricated framework which includes a transverse cross member 21 securely connected at the ends to said side plates 19, a pair of spaced apart vertical arms 22 which are centrally positioned and are secured at the lower forward corners to the cross members 21, a cross member 23 rigidly interposed between the rear vertical arm 22 and side plate 19 respectively, a cross member 24 rigidly interposed between the left vertical arm 22 and side plate 19 respectively, a rearwardly extending triangular arm plate 25 positioned adjacent the inner side of the right wheel 13 and secured to the cross members 21 and 23 respectively, and a rearwardly extending triangular arm plate 26 positioned adjacent the inner side of the left wheel 13 and secured to the cross members 21 and 24 respectively. Both arm plates 25 and 26 are supported on the right and left axles 12, as indicated at 25a and 26a respectively. A cross member 27 is interposed between the arm plates 25 and 26 and carries, rigidly secured thereto, the lower rear corners of the vertical arms 22. The upper ends of the vertical arms 22 are rigidly inter-connected by a tubular cross member 28, on which is mounted a block of three sheaves 29.

The side elements 11 of the primary frame structure are provided with upwardly extending brackets 30 which are connected at the upper ends thereof to a tubular cross member 31 which in turn has secured thereto, intermediate its ends, a block of five sheaves 32. The tubular cross member 20, at the forward end of the secondary frame 18, has secured thereto, intermediate its ends, a block of three sheaves 33.

A cable 34, anchored or dead-ended at the cross member 31, as at 35, is reaved between three of the sheaves 32, on the primary frame 10, and two of the sheaves 33, on the secondary frame 18, and is then passed under a sheave 36 on the cross member 14, over a sheave 37 on the leg 15, passed through a swiveled sheave 38, and connected to a suitable power-controlled hoist on the tractor.

By pulling and releasing the cable 34, vertical swinging movement is imparted to the secondary frame 18 about the axles 12 of the rear wheels 13, thereby raising and lowering the implement.

A bowl 39, comprising a bottom 40, a back 41, and side members 42, is supported at the forward end on a pair of links 43. The links 43 are pivotally connected at their lower ends to the bowl side members 42, as at 44, and at their upper ends to the side plates 19 of the secondary frame, as at 45. The lower rear corners of the bowl side members 42, are provided with rearwardly extending brackets 46 which carry at the outer ends thereof rollers 47. The rollers 47 are guided in vertical channels 48 which are secured to the inner surfaces of the secondary frame plate members 19. A block of two sheaves 49 is secured to the back of the bowl at the bottom edge thereof. A cable 50, dead-ended as at 51 at the cross member 28, is reaved between two of the sheaves 29 on the secondary frame, and one of the sheaves 49, on the bowl 39, and is then passed over one of the sheaves 32 on the primary frame, over a sheave 52 on the cross member 14, over a sheave 53 on the leg 15, passed through a swivel sheave 54, and connected to a power controlled hoist on the tractor.

By exerting a pulling force on the cable 50, the rear end of the bowl 39 is raised vertically, by virtue of the guide rollers 47 in the vertical channels 48. The upward movement of the rear end of the bowl causes the forward end of the said bowl to swing rearwardly on the links 43, thereby tilting the bottom of the bowl to discharge the load, as may be observed in Figure 4. Stops 54 and 55 are provided at the upper and lower ends, respectively, of the channels 48, to limit the raising and lowering positions of the rear end of said bowl.

A closure or apron 56 is provided for the receiving end of the bowl to retain the load during transportation. The closure 56, includes a pair of arms 57 which extend rearwardly and are pivotally supported at their rear ends on the side plates 19, as at 58. The apron 56 is provided with a forwardly extending bracket 59, to which one end of a cable 60 is connected, as shown at 61. The cable 60 is passed over one of sheaves 33 on the forward end of the secondary frame 18, over one of the sheaves 32 on the cross member 31 of the primary frame 10, over one of the sheaves 29 on the cross member 28 at the rear of the secondary frame, under a sheave 62 journaled on a shaft 63, supported between the vertical arms 22 near the lower ends thereof, over one of the sheaves 49 at the back of the bowl 39, and dead-ended at the rear of the bowl, as at 64. (See cable diagram in Figure 5.)

Figure 3:
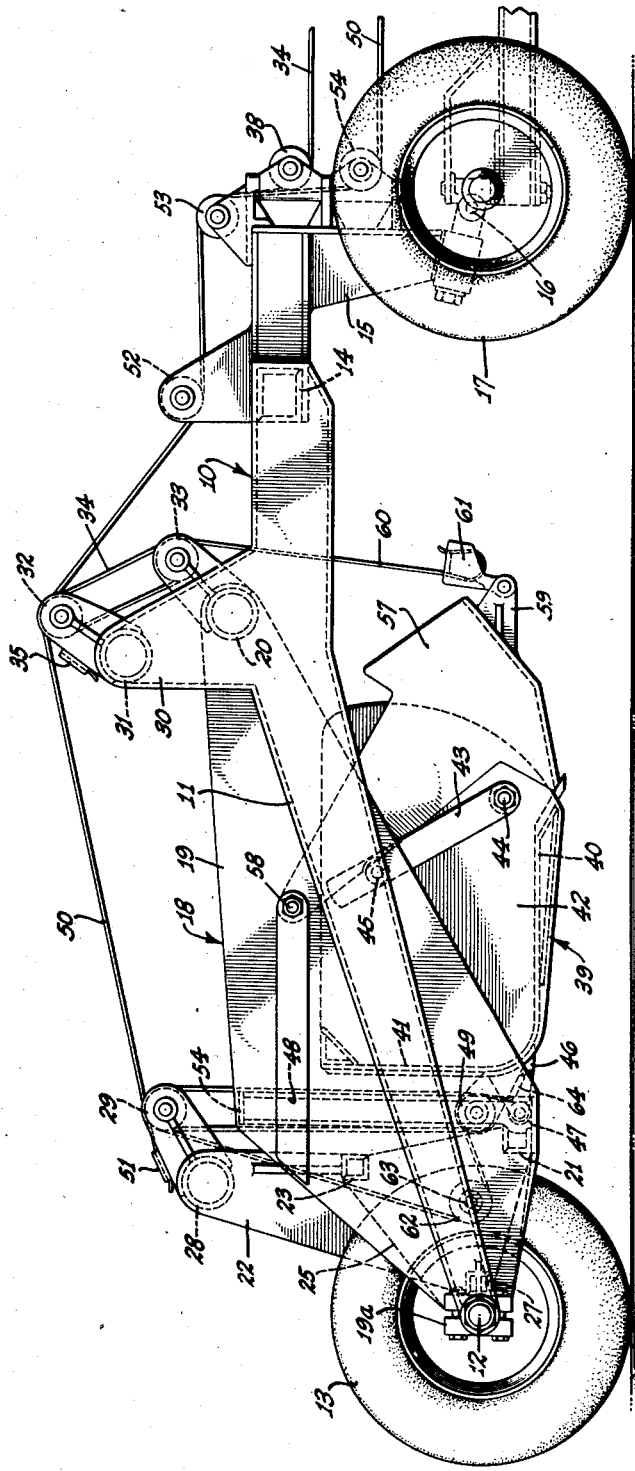
Figure 3 is a side elevation of the scraper in the load-carrying position.

The bowl closure 56 is controlled by the tilting of the bowl 39 and by the raising and lowering of the secondary frame 18. Figure 3 shows the implement in the load carrying position, wherein the bowl is raised above the ground surface. The cable 60 is just long enough to support the apron 56 in the closed position at the receiving end of the bowl, to prevent spilling of the dirt during transportation.

By reason of the inter-connecting cable 60, the opening and closing of the apron 56 is simultaneously effected, in a proportionate degree, by the tilting and the restoring of the bowl respectively. Figure 4 shows the bowl tilted for discharging the dirt wherein the cable 60 is pulled by the elevation of the rear end of said bowl to raise the apron 56 into the open position.

The inter-connecting cable 60 is passed over one of the sheaves 32 on the fixed primary frame 10 to support the apron in the closed position which is slightly above the ground surface as shown in Figure 3, so that the bowl 39 may be lowered into the scraping position by swinging the secondary frame 18 downwardly, without affecting the position of the apron. Thus, the scraping end of the bowl is dropped away from the apron to provide an opening for admittance of the scraped up dirt into the bowl and the size of said opening is thereby automatically controlled in proportion to the depth of the scraping operation.

Upon completing the scraping operation, the loaded bowl is simply raised up to the apron to close the receiving end of the bowl for transportation.

Having thus described my invention, I claim:

1. A scraper comprising a fixed primary frame, a vertically swingable secondary frame, a tiltable scraper bowl on said secondary frame, a vertically swingable closure for the receiving end of said bowl mounted on said secondary frame, a cable connecting the bowl to the bowl closure to open said closure by raising it simultaneously with the tilting of said bowl and to close said closure by lowering it simultaneously with the returning of said bowl to the horizontal position, means for supporting said cable on said primary frame to open the receiving end of said bowl by dropping said receiving end away from said closure while lowering said bowl into the scraping position upon swinging said secondary frame downwardly, thereby providing an opening proportionate in size to the depth of the scraping operation to admit the scraped up material into the bowl.

2. A scraper comprising a fixed primary frame, a vertically swingable secondary frame, a tiltable scraper bowl on said secondary frame, a vertically swingable closure for the front end of said bowl on said secondary frame, a cable connecting said closure to the rear end of said bowl to open said closure by raising it simultaneously with the tilting of said bowl and to close said closure by lowering it simultaneously with the returning of said bowl to the horizontal position, said cable being associated with said primary frame to control the opening of the receiving end of said bowl by dropping said receiving end away from said closure when lowering said bowl into the scraping position upon swinging said secondary frame downwardly, thereby providing an opening proportionate in size to the depth of the scraping operation to admit the scraped up material into the bowl.

3. A scraper comprising a primary frame, a vertically movable secondary frame, a tiltable scraper bowl on said secondary frame, a closure for said bowl, pulleys on said primary and secondary frames, a cable interconnecting said bowl closure and bowl, said cable being passed over the pulleys so that the bowl closure may be controlled in one instance by the tilting of said bowl and in another instance by moving said secondary frame.

4. In a scraper comprising a fixed primary frame, a vertically movable secondary frame, a tiltable scraper bowl mounted on said secondary frame, a closure for said scraper bowl mounted on said secondary frame, a cable interconnecting said bowl and bowl closure, said cable being passed over pulleys arranged on said primary and secondary frames so that said closure may be controlled by movement of the secondary frame while said bowl is held fixed relative to said secondary frame and so that said closure may be controlled by the tilting movement of said bowl while the secondary frame is held fixed relative to said primary frame.

5. A scraper comprising a fixed primary frame, a vertically movable secondary frame, a tiltable scraper bowl on said secondary frame, a closure for said bowl mounted on said secondary frame, means interconnecting the bowl and the bowl closure, said interconnecting means being associated with said primary and secondary frames so that said bowl closure may be opened and closed either by respectively moving the secondary frame down and up or by respectively tilting the bowl for discharging and returning said bowl to the carrying position.

6. A scraper comprising a primary frame, a vertically swingable secondary frame, a tiltable scraper bowl on said secondary frame, a closure for said bowl mounted on said secondary frame, a cable interconnecting the bowl and the bowl closure, said cable being passed over pulleys arranged on said primary and secondary frames so that said bowl closure may be opened and closed in one instance by tilting the bowl for discharging and returning it to the carrying position respectively and in another instance by swinging the secondary frame to lower the bowl into and raise it out of the scraping position respectively.

7. In a scraper, having: ground support; a main frame, supported thereby in such manner as to be raisable and lowerable with respect to the ground; a digging blade, carried by the main frame; a dumping and dirt-holding bowl, pivoted to the main frame adjacent the blade; a front apron, pivotally supported by the main frame, and adapted when lowered, to retain dirt within the bowl; and means to raise the main frame and thereby the blade; the combination therewith of: interlocking rope means, operatively connecting the apron to the main frame, to one of the ground supports, and to the bowl, in such a way that, whenever either the main frame is lowered, or the bowl is moved to dump, this motion will raise the apron.

8. In a scraper, having: ground support; a main frame, supported thereby in such manner as to be raisable and lowerable with respect to the ground; a digging blade, carried by the main frame; a dumping and dirt-holding bowl, pivoted to the main frame adjacent the blade; a front apron, pivotally supported by the main frame, and adapted, when lowered, to retain dirt within the bowl; and means to raise the main frame and thereby the blade; the combination therewith of: interlocking rope means, operatively connecting the apron to the main frame, to one of the ground supports, and to the bowl, in such a way that, whenever either the main frame is lowered, or the bowl is moved to dump, this motion will raise the apron; and that a reach of this rope extends rearwardly from the bowl to some other portion of the scraper with respect to which other part the bowl is relatively movable during dumping, thus tending to initiate the return of the bowl from dumping position to dirt-holding position.

9. In a scraper, having: ground support; a digging blade, supported thereby; a main body, supported by the ground support, in such manner as to be raisable and lowerable with respect to the ground; a dumping element, supported by the ground support, and adapted to extrude dirt, and capable, in conjunction with the main body, of serving as a main dirt-container; a raisable front apron, adapted when lowered to retain dirt within the main dirt-container; means to raise the main dirt-container and thereby the blade; and means to cause the dumping element to extrude dirt; the combination therewith of: interlocking means, operatively connecting the apron to the ground support and to an element which rises and falls with the blade, in such a way that the lowering of the blade will raise the apron; and other means, operatively connecting the apron to the ground support and to a source of power, for raising the apron, when the blade has been raised.

10. In a scraper, having: ground support; a main frame, supported in such manner as to be raisable and lowerable with respect to the ground; a digging blade, carried by the main frame; a dumping and dirt-holding bowl, pivoted to the main frame adjacent the blade; a front apron, pivotally supported by the main frame, and adapted, when lowered, to retain dirt within the bowl; and means to raise the main frame and thereby the blade; the combination therewith of: interlocking rope means, operatively connecting the apron to the main frame and one of the ground supports, in such a way that the lowering of the main frame will raise the apron; and other means operatively connecting the apron to the ground support and to a source of power, for raising the apron, when the main frame has been raised.

11. In a scraper, having: ground support; a digging blade, supported thereby; a main body supported by the ground support, in such manner as to be raisable and lowerable with respect to the ground; a dumping element, supported by the ground support, and adapted to extrude dirt, and capable, in conjunction with the main body, of serving as a main dirt-container; a raisable front apron, adapted when lowered to retain dirt within the main dirt-container; means to raise the main dirt-container and thereby the blade; and means to cause the dumping element to extrude dirt; the combination therewith of: interlocking means, operatively connecting the apron to the ground support and to an element which rises and falls with the blade, in such a way that the lowering of the blade will raise the apron; and other interlocking means, operatively connecting the apron to the ground support and to the dumping elements, in such a way that motion of the dumping element to extrude dirt will raise the apron.

MAX M. BRODERSEN.